June 16, 1964 H. GREENBERG Re. 25,604

END FIRE PLANAR DIPOLE ARRAY WITH LINE TRANSPORTATION BETWEEN DIPOLES AND IMPEDANCE INCREASE TOWARDS FEED

Original Filed Oct. 19, 1960 4 Sheets-Sheet 1

INVENTOR.
HARRY GREENBERG
BY Darby & Darby
ATTORNEYS

INVENTOR.
HARRY GREENBERG
BY Darby & Darby
ATTORNEYS

June 16, 1964 H. GREENBERG Re. 25,604

END FIRE PLANAR DIPOLE ARRAY WITH LINE TRANSPORTATION BETWEEN DIPOLES AND IMPEDANCE INCREASE TOWARDS FEED

Original Filed Oct. 19, 1960

4 Sheets-Sheet 3

INVENTOR.
HARRY GREENBERG
BY Darby & Darby
ATTORNEYS

END FIRE PLANAR DIPOLE ARRAY WITH LINE TRANSPORTATION BETWEEN DIPOLES AND IMPEDANCE INCREASE TOWARDS FEED

Original Filed Oct. 19, 1960 4 Sheets-Sheet 4

INVENTOR.
HARRY GREENBERG
BY Darby & Darby
ATTORNEYS

United States Patent Office

Re. 25,604
Reissued June 16, 1964

25,604

END FIRE PLANAR DIPOLE ARRAY WITH LINE TRANSPORTATION BETWEEN DIPOLES AND IMPEDANCE INCREASE TOWARDS FEED

Harry Greenberg, Kerhonkson, N.Y., assignor to Channel Master Corporation, Ellenville, N.Y., a corporation of New York Original No. 3,086,206, dated Apr. 16, 1963, Ser. No. 63,520, Oct. 19, 1960. Application for reissue Nov. 21, 1963, Ser. No. 334,069
18 Claims. (Cl. 343—815)

Matter enclosed in heavy brackets [ ] appears in the original patent but forms no part of this reissue specification; matter printed in italics indicates the additions made by reissue.

The present invention relates to antennas for the propagation or reception of electromagnetic energy of radio frequencies and more particularly to such antennas adapted for use in noncontiguous frequency bands such as the high band and the low band portions of the frequencies allocated to VHF television, or in very wide frequency bands, where the ratio of the highest frequency to the lowest frequency may be 3 or more.

The wide-spread use of television receivers has brought about a demand for highly developed television receiving antennas, particularly for use in areas far removed from transmitters from which it is desired to receive television broadcasts. Antennas for these remote areas are customarily called fringe-area antennas. A prime requisite for such an antenna is that it have a high degree of signal gathering ability. This ability is commonly referred to in terms of gain, gain being defined as the antenna's signal-gathering ability compared to a standard dipole antenna, and usually expressed in decibels (db). Another important requisite is that the antenna be able to discriminate against broadcasts from other than desired directions. This requires that the receptivity pattern have essentially a single major lobe or at most two oppositely directed lobes, of as much sharpness as is practicable or desirable for particular situations.

Antennas are inherently frequency selective devices which respond best to a limited range of frequencies and are substantially ineffective outside of this range. While one could provide a separate television antenna for each television channel to be received, this would obviously be impractical. It is, of course, most desirable to have a single antenna for all television channels. Such an antenna is customarily known as an all-channel antenna. The manner in which television frequencies in the VHF television band have been allocated has rendered it most difficult to provide an efficient all-channel VHF television antenna.

While there are only twelve VHF television channels, each six megacycles wide, these channels are not allocated to wholly contiguous frequency ranges, but are divided into a low band extending from 54 megacycles to 88 megacycles and a high band extending from 174 megacycles to 216 megacycles. Thus the highest VHF television frequency of 216 megacycles exceeds the lowest VHF television frequency of 54 megacycles by a factor of four. This band-width has heretofore rendered exceedingly difficult the design of a single all-channel antenna.

By the present invention a television antenna for all VHF television channels is provided which is of remarkable efficiency. This is accomplished by providing a front-fed, in-line television antenna with multiple driven elements which effectively covers the low band portion of the VHF television frequencies, operating throughout the low band in a single mode. Features are included which render the antenna elements and the array taken as a whole also effective on the high-band portion of the VHF television range.

Suitable operation of the antenna on the high-band is achieved by especially designing the individual element configuration to obtain a good radiation or reception pattern on the high-band channels, and, at the same time, providing a particular impedance relationship between the elements of the array on the high-band which provides a high efficiency for the array as a whole; this is accomplished while maintaining proper low band operation.

The basic configuration of the antenna also provides an exceptionally good directivity characteristic and "front-to-back-ratio." This ratio is a measure of the ability of the antenna to reject signals from directions opposite to those of the desired signal. This is a particularly important consideration at the present time in fringe areas due to the increased number of television transmitters, and due to the fact that, in fringe areas, transmitters within the range of a particular receiver will usually be located in several different directions. Thus a high degree of directivity and a high "front-to-back-ratio" is very desirable for eliminating both co-channel and adjacent channel interference. The high front-to-back ratio of antennas according to the present invention is provided in a substantial part by the transposition-type of connection of the transmission line and the front-fed arrangement of the array, for reasons which will be more fully explained hereinafter.

The antennas provided by the present invention in particular represent an improvement over antennas disclosed in U.S. Patent No. 2,817,085 issued Dec. 17, 1957, to Jerome Schwartz and Yuen Tze Lo, but as will later be explained, some basic theories upon which the antennas of the aforementioned Schwartz et al. patent are based may be utilized in antennas according to the present invention.

In addition to providing the advantages and features described above, it is an object of the present invention to provide a high-gain television antenna having multiple in-line active elements, which antenna is effective on two separated frequency bands, and particularly where such two bands, bear approximately a harmonic relationship.

It is another object of the present invention to provide a television antenna having several in-line active dipole elements fed from the front of the array by a transmission line.

It is still another object of the present invention to provide an antenna of the foregoing type wherein the absorption of energy by the individual elements is successively greater in a direction away from the feed point or front of the antenna for two or more of the elements at all frequencies within the operating frequency range of the antenna.

It is still another object of the present invention to provide an antenna of the foregoing type wherein the transmission line connecting the antenna elements has a transposition between each antenna element and its succeeding element.

It is a further object of the present invention to provide a television antenna of the foregoing type wherein the antenna elements are caused to have a good reception pattern or directivity by use of a relatively short parasitic element closely spaced in front of each simple dipole element.

It is a still further object of the present invention to provide a television antenna of the previously described type wherein good directivity is provided by use of V-shaped active elements with the apex of each V pointing in the direction opposite to the direction of maximum effectiveness of the antenna.

Other objects and advantages of the present invention will be apparent from a consideration of the following description in conjunction with the appended drawings, in which.

Figure 1:
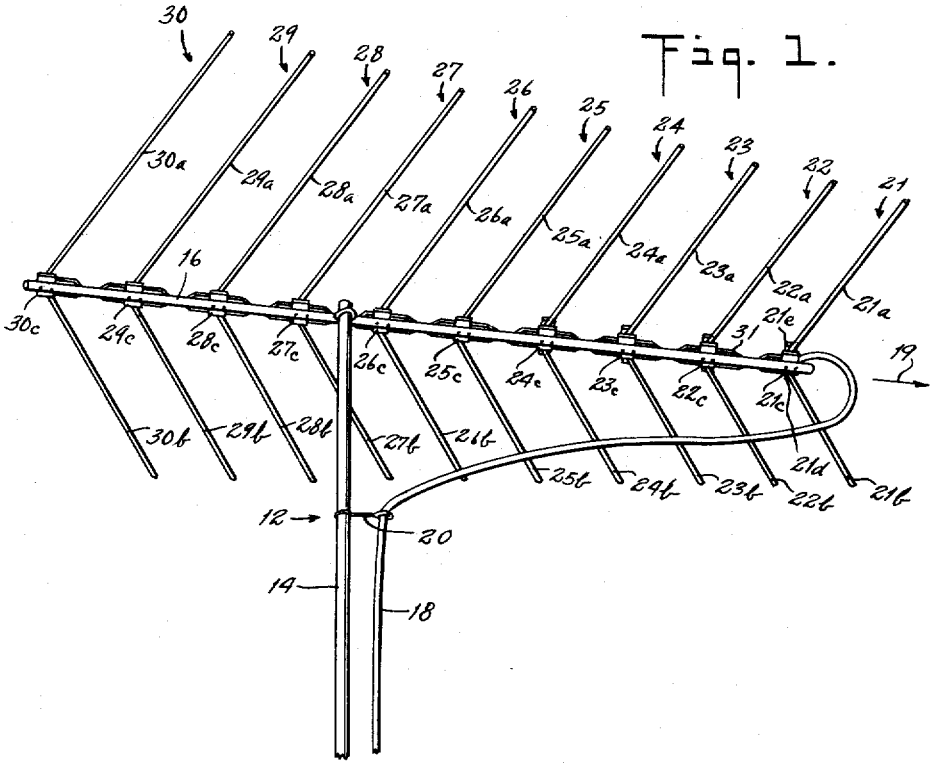
FIGURE 1 is a perspective view of one form of antenna array according to the present invention.
Figure 2:
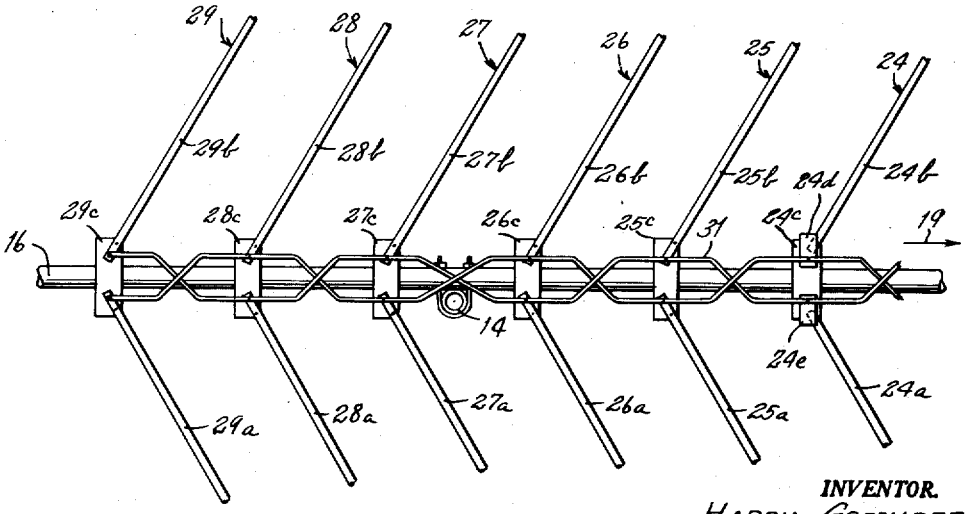
FIGURE 2 is a plan view of a portion of the antenna array of FIGURE 1.

Referring to FIGURES 1 and 2, an antenna array 12 is shown having a mast 14 and a horizontal boom 16 for the support of a plurality of active antenna elements. A signal transmission line 18 is provided which is supported by suitable supports shown at 20 for example. Line 18 connects the antenna to a receiver or transmitter, as the case may be.

The antenna array comprises illustratively ten active dipole elements numbered 21 through 30 reading from right to left in FIGURE 1. These progressively vary in length, from the shortest element 21 to the longest element 30. The signal transmission line 18 is connected to the shortest dipole element 21 (to the right in FIGURE 1). The dipole element 21 is at the front of the antenna, or in other words, the direction of maximum effectiveness of the antenna is toward the right in FIGURE 1, as shown by the arrow 19.

Throughout this discussion, the antenna arrays according to the present invention may be considered from time to time as transmitting antennas. This is a technique often employed in the antenna art, and by the principle of reciprocity for transmitting and receiving antennas, conclusions reached by considering the antenna as a transmitting antenna are also known to be applicable for the antenna utilized as a receiving antenna. Obviously, antennas according to the present invention may be utilized either as transmitting antennas or as receiving antennas, but are primarily designed for use as television receiving antennas.

Each of the antenna elements 21 to 30 comprises respectively a right arm 21a to 30a, and a left arm 21b to 30b.

The pair of arms of each antenna element are disposed at an angle to form a V, with the apex of the V pointing in a direction opposite to the direction 19 of maximum effectiveness of the antenna. In the particular example illustrated, the angle of each of the V's is the same, although this need not necessarily be the case.

A two-wire transmission line harness 31 is provided for connecting antenna elements 21 to 30 in parallel with one another and to the signal transmission line 18. The two-wire transmission line harness 31 will be noted to have a transposition between each pair of successive antenna elements so that alternate ones of the antenna elements 21 to 30 are connected electrically in opposite sense to the transmission line harness 31. The advantage of this connection will be more fully explained hereinafter in the course of explanation of the operation of the antenna.

The physical structure of the antenna 12 is shown in greater detail in FIGURE 2, and for convenience, the connecting structure for antenna elements 25 and 24 will be described in more detail, with the understanding that other elements of the antenna have connecting structures similar to one or the other of elements 25 and 24.

The arms 25a and 25b of antenna element 25 are connected to boom 16 by means of an insulating support 25c and are thus electrically insulated from each other and from the antenna boom 16.

The inner end of arm 25a and the inner end of arm 25b are connected to respective wires of the two-wire transmission line harness 31. Elements 26 to 30 are of generally similar construction to element 25, the portions of each being assigned the same reference number as the element itself with a suffix letter corresponding to those assigned to the portions of element 25.

Element 24 is arranged with each of the arms 24a and 24b connected at its inner end to an insulating support 24c by riveting, bolting, or any other suitable connection, the precise nature of which does not form a part of the present invention. The inner ends of arms 24a and 24b are not, however, connected directly to respective wires of the transmission line harness 31, but are rather connected through respective capacitors 24d and 24e to respective wires of the two-wire transmission line 31. Capacitors 24d and 24e may be of any conventional type provided with a suitable weather-proof enclosure or otherwise immune to weather variations. Exemplary capacitance values for the capacitors utilized in the antenna of FIGURES 1 and 2 is given in tabular form hereinafter with other dimensions and characteristics of the antenna.

The construction of antenna elements 21 to 23 is generally similar to that described for element 24 and corresponding components of the elements 21 to 23 have been given reference numbers consisting of the reference number of the antenna element plus a suffix letter corresponding to that of the corresponding component of antenna element 24.

Figure 3:
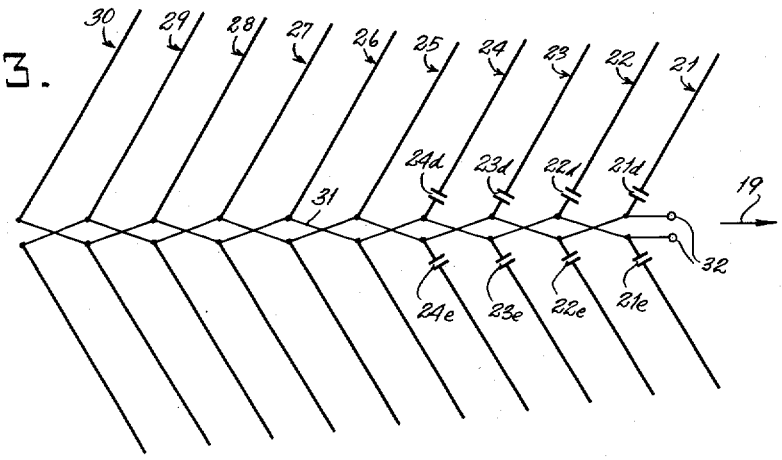
FIGURE 3 is an electrical-schematic diagram of the antenna of FIGURE 1.

The electrical characteristics of the antenna of FIGURE 1 are represented in FIGURE 3 wherein it will be seen that an antenna is provided having a multiplicity of active aligned V-shaped dipole elements (in this case ten) interconnected by an alternately transposed transmission line harness 31. Certain of the dipole elements are provided with capacitors in series with the arms thereof at their inner ends (in this specific illustrative example, four active elements 21 to 24 are so provided with capacitors). The capacitors function to permit proper operation on the high band as well as the low band, as described more in detail below. It will be noted from FIGURE 3 that the signal transmission line 18 is connected to the antenna at terminals 32 at the front of the antenna.

In explaining the operation of the antenna it is desirable to first explain the operation of a single one of the V-dipole elements. It is an important feature of the present invention, where the antenna is to be used as a dual-band V.H.F. television antenna, to construct each of the dipole elements to have good directivity and reception pattern shape on both bands. This is accomplished in the embodiment of FIG. 1 by arranging each dipole element with its arms tilted slightly forward toward the source of received signals. VHF television signals are broadcast in two separate bands with channels 2 through 6 being in the lower band between 54 and 88 megacycles per second and channels 7 through 13 in the upper band between 174 and 216 megacycles per second. Approximately half of the television channels therefore have frequencies which are roughly three times the frequencies of the other half of the television channels. It has been found that the response curve of a dipole antenna as a function of frequency for dual-band VHF television signals can be improved by tilting the arms of the dipole forward by an angle of approximately 30 to 40 degrees, leaving a subtended angle of 120 to 100 degrees between the arms.

Figure 4:
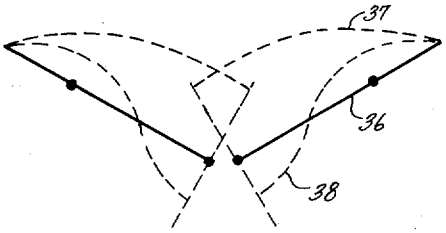
FIGURE 4 is a schematic diagram of a V-type dipole showing the current distribution for the dipole.

A dipole which is one-half wavelength in the lower band will be approximately three-half wavelengths long in the upper band. A dipole 36 is shown in FIG. 4 with dashed lines 37 indicating current distribution for low band signals and dotted lines 38 indicating current distribution for high-band signals. In a straight dipole, three-halves wavelength operation results in a clover leaf radiation pattern with a forward null and 45° oriented side lobes. Tilting the arms forward tends to produce a centered forward lobe and eliminate the lobes oriented 45° from center forward.

Previously, multiple-element end-fire arrays have been suggested, in which the several elements have had different resonant frequencies in order to operate at more than one frequency. Such antennas have had relatively limited band width. While the band width could be increased by addition of further elements, to expand the array enough to cover a frequency range of the order of 300% or more leads to an impracticable array because of the large number of elements which would be required.

Similarly, while individual dual-band antenna elements such as V-dipoles have been known, it is not generally possible to convert a multi-element single-band antenna array to a dual-band antenna array simply by substituting dual-band elements for the elements in the multi-element single-band array; this is believed to be caused by the erratic impedance relations which then exist among the various elements, particularly at high-band frequencies, and to the effects of higher-mode operation at such frequencies, which normally cause degraded reception patterns and gain.

The present invention has overcome these disadvantages and has solved the problem of providing a dual-band antenna effective on both the high and low band portions of the VHF television frequency allocation or effective over a band width of the order of 4 to 1 or more.

The antenna of FIGURE 1 belongs to the broad family of end-fire antenna arrays. An important feature of the present antenna is that it is fed from the front end (i.e. the signal line 18 is coupled there) and transpositions are provided in the interconnecting transmission line harness 31 between adjacent antenna elements. It should further be noted that the antenna of FIGURES 1 to 3 is not of the type where the active elements are respectively designed to be individually resonant each at a particular channel or portion of the antenna operating frequency range, but rather, at each frequency range portion or television channel several active elements cooperate to increase signal gathering ability. This cooperation is achieved by causing those antenna elements which are active to have individual impedances which are graduated and increase as one progresses toward the feed point of the antenna array.

Antennas according to the present invention with a transposition-type of interconnecting transmission line harness provide an exceptionally good front-to-back ratio even as compared with previously successful end-fire antenna arrays such as that shown in Schwartz et al. Patent No. 2,817,085. An intuitive understanding of how the antenna operates to provide superior front-to-back ratio may be acquired from the following explanation. The antenna will be considered as a transmitting antenna to aid in the explanation. Referring to FIGURE 3, consider a particular signal transmitted to the input terminals 32. This signal will be partially absorbed and radiated by the first antenna element 21 while a portion of the signal will continue along transmission line harness 31 and will then be partially absorbed and radiated by antenna element 22. Obviously it is desirable that the wave radiated from antenna element 22 toward the right in FIGURE 3 should arrive at antenna element 21 in phase with the wave radiated from that element. Three major factors affect this relationship: the length of transmission line harness 31 between the two active elements, the free space distance between the two elements, and the 180° phase shift imparted by the transposition in transmission line harness 31. The first two of these factors can readily be adjusted so that the total phase shift is 360° and so that the waves radiated to the right by antenna elements 21 and 22 are respectively in phase at each point along direction 19. Similar considerations would apply to the remaining pairs of elements.

To achieve a high front-to-back-ratio it is conversely desirable that little or no energy be radiated to the left in FIGURE 3. This will be accomplished if the radiation from the various elements is approximately equal and the radiation from adjacent elements is substantially 180° out of space phase, since the velocity of propagation in transmission line harness 31 is equal to the free space velocity of propagation and the length of transmission line harness 31 is substantially equal to the spacing between adjacent elements 21 and 22. In such a case, the phase delay of the wave from element 21 to any point differs 180° from that of element 22 due to the phase shift in the transposed transmission line of length equal to the element spacing. It is also noteworthy that the anti-phase condition for adjacent elements for backward propagation obtains substantially without regard to frequency, which provides the good front-to-back-ratio for all elements. In view of the inherently high front-to-back-ratio of the antenna array according to the present invention, it may not be necessary to provide a parasitic reflector element, and in fact, no such element is required in the antenna of FIGURES 1–3.

From the foregoing explanation, it will be seen that the front-fed, end-fire antenna array with transpositions in the interconnecting transmission line harness between adjacent antenna elements is well adapted to provide an efficient VHF television antenna with high front-to-back-ratio. However, without special provision according to other features and aspects of the present invention, such an antenna would be suitable for use only for a relatively limited band such as the low band of VHF television broadcasting.

It might be thought that such a single-band antenna could be readily adapted for dual-band operation for both the high and low bands of the VHF television frequency allocations, merely by replacing each simple element with a dual-band element. However, the complexity of the interactions of the elements under the widely differing frequencies encountered in such an antenna places numerous difficulties in the way of extending the operation of such an antenna to dual-band operation. Important impedance relationships which may exist in the low band, would not automatically exist in the high band, where each active dipole element operates in a harmonic mode and hence at a different region of its impedance characteristic. By the present invention it has been made possible to utilize a front-fed end-fire antenna array on the low band as well as the high band, by use of features providing proper impedance relationships both on the high band and on the low band.

In accordance with the present invention, a desired impedance relationship between the various antenna active elements on both bands may be achieved by determination of two parameters, for at least some of the elements, one of which desirably is the length of the antenna element. In the embodiment of the invention illustrated in FIGURES 1–3, utilizing V-type dual-band antenna elements, a capacitor is inserted in series with each arm of certain antenna elements at their inboard ends. The capacitance value of each capacitor is chosen in relation to the element length, to determine the impedance value of its associated antenna element so as to obtain a desired relationship between the various elements for operation in both [hands] *bands*. A desirable way to design the antenna is to first select element lengths suitable for high band operations. Then, since the effect produced by the capacitors is relatively small for the high-band frequencies, either the selected length will remain unchanged, or a compensating adjustment can be made in the length of the dipole arms to completely off-set the effect of the capacitor at high-band frequencies.

Figure 6:
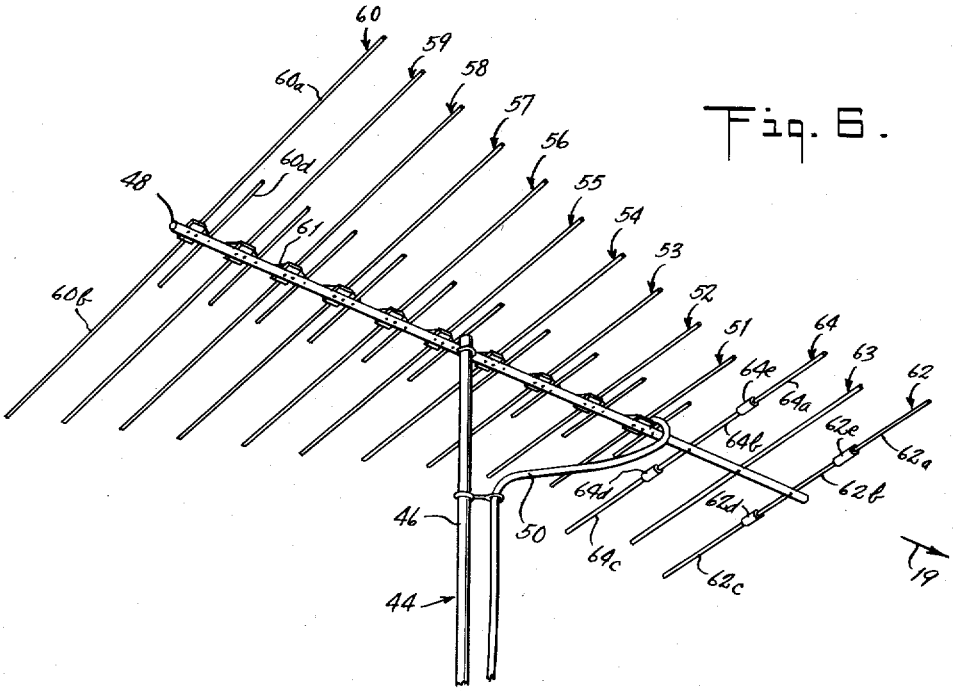
FIGURE 6 is a perspective view of an alternative form of antenna according to the present invention.
Figure 7:
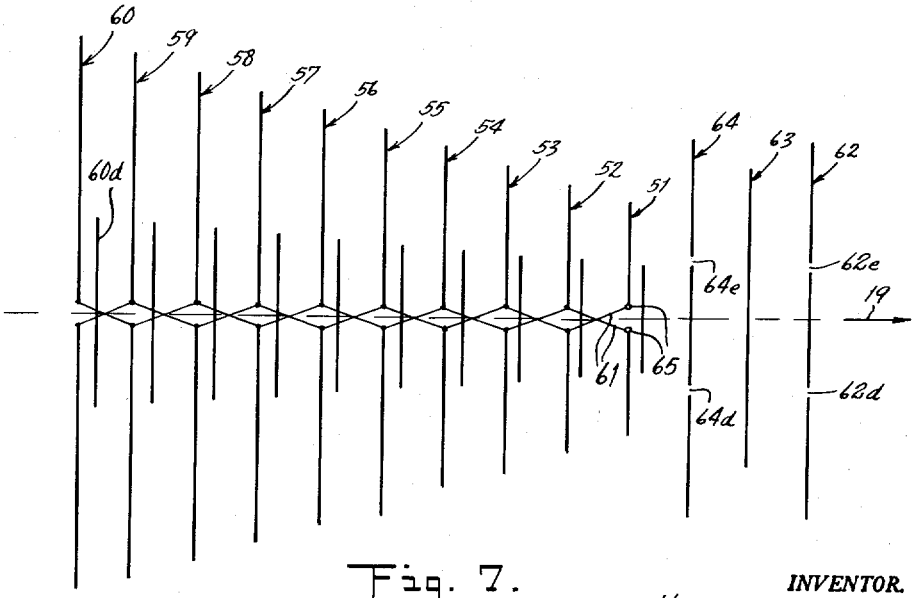
FIGURE 7 is an electrical schematic diagram of the antenna of FIGURE 6.

Other means can be utilized to provide the desired impedance relationship in both bands. In FIGURES 6 and 7 for example, an alternative embodiment of the invention is illustrated utilizing substantially straight rather than the V-shaped dipole elements, with each straight dipole having a relatively close-spaced short, parasitic element in front of it.

The antenna of FIGURES 6 and 7 is otherwise generally similar to the embodiment of FIGURES 1 to 3. The antenna array 44 has a supporting mast 46 and a horizontal boom 48. A signal transmission line 50 is provided to connect the antenna array to a utilization device such as a television receiver.

The array 44 has ten active elements 51 to 60 of progressively varying length, each comprising substantially co-linear arms 51a and 51b through 60a and 60b, inclusive. The active elements 51 to 60 are interconnected by an interconnecting transmission line harness 61 in a fashion similar to that shown in FIGURES 1 to 3. Insulating supports 51c to 60c are provided for securing the arms of the antenna elements in insulated relation to the boom 48 and to each other. Each of the dipoles 51 to 60 is provided with a respective close-spaced short parasitic element 51d to 60d, on the front side of the dipole.

The short parasitic elements 51d to 60d do not substantially affect the operation of the dipoles 51 to 60 on the low-band frequencies; hence the lengths of the dipole arms can be selected as appropriate for low-band operation, and to the extent that the operation is affected compensation can be made by slightly altering the lengths of the dipole arms. The parasitic elements 51d to 60d are effective at high-band frequencies to provide a sharp directivity pattern for the active elements and hence for the array as a whole. In addition the length of each parasitic element 51d to 60d and its spacing from its respective dipole can be individually selected in order that the impedance of the dipole-parasite combination on the high-band can be determined substantially independently of the dipole impedance at low-band frequencies. Thus the close-spaced parasites of the embodiment of FIGURES 6 and 7 provide an independent parameter for determination of impedance at high-band frequencies in a manner comparable to that of the capacitors in the embodiment of the antenna array illustrated in FIGURES 1 to 3.

Although they are not essential to the operation of the antenna array, the antenna array 44 is provided with parasitic director elements 62, 63 and 64. Parasitic elements 62 and 64 are of the dual-band type and comprise, respectively, conductive segments 62a, 62b, 62c and conductive segments 64a, 64b and 64c. Insulating junctions 62d and 62e are provided for parasitic element 62 and corresponding insulating junctions 64d and 64e are provided for parasitic element 64, so that the segments 62a, 62b, 62c are insulated from one another, as are segments 64a, 64b, 64c. Director 63 is a unitary low-band director. The parasites 62, 63, and 64 operate in a substantially conventional manner to increase the directivity and gain of the antenna array, both at high-band and low-band frequencies. Optionally, other forms of parasite may be used.

The present invention is of course not limited to use with the forms of active elements shown with respect to the above described embodiments of the invention. Other types of element and of impedance adjusting means may be employed, suitable to derive the impedance relations described herein below in greater detail. By way of example, an array of simple straight dipoles can be utilized, graduated in length as in FIGS. 6 and 7, or an array of V-dipoles as in FIGURE 1 but at least some utilizing an individual tuning stub or impedance element at its terminals, to determine its desired impedance value.

Alternatively any combination of various types of elements may be utilized, for example longer elements may be of the V-type while shorter elements are straight, the shorter elements having close-spaced parasites or not as preferred.

An important aspect of the invention resides in the impedance relationships which are achieved between the various active elements of the antenna array and particularly those which are achieved at high-band frequencies, as by selection of the capacitance values for the capacitors in the embodiment of FIGURES 1 to 3 or by the characteristics of the close-spaced short parasitic elements in the embodiment of FIGURES 6 and 7, or by other means.

Figure 5:
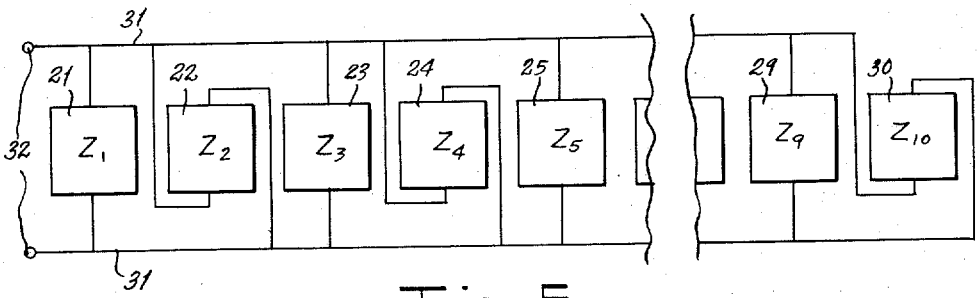
FIGURE 5 is a schematic circuit diagram presented to aid in the explanation of a theory of operation of the antenna of FIG. 1.

This impedance relationship which contributes substantially to the efficiency of the antenna may be understood by reference to FIGURE 5 and FIGURES 8–11. A schematic diagram of an antenna according to the invention is shown in FIGURE 5 wherein each of the antenna elements 21 to 30 has been replaced by its impedance at a particular frequency represented by boxes labeled $Z_1$ to $Z_{10}$. Returning to the technique of considering the antenna as a transmitting antenna, assume that a television signal, for example a signal of channel 2 frequency is supplied to the input terminals 32. If the impedance $Z_1$ is very small in value compared to the impedance value looking along the transmission line 31 from the terminals of impedance $Z_1$ to the right in FIGURE 6, then substantially all the unreflected signal will be absorbed in $Z_1$, that is, in antenna element 21, and all antenna elements farther along transmission line harness 31 will be substantially ineffective. The same is true for the other successive impedance (except the last imepdance $Z_{10}$).

On the other hand, if any of the impedances $Z_1$ to $Z_{10}$ were very high in value compared with the impedance of transmission line harness 31, then that particular antenna element represented by the relatively very high impedance would be relatively ineffective in absorbing energy from the signal.

It is also useful to consider the relative amount of power flow at the junction of any particular impedance which is absorbed by that impedance. It will be understood that the proportion of total entering power which is absorbed by an impedance will be inversely proportional to the value of the impedance relative to the impedance of the remainder of the transmission line viewed from that point. It can also be readily seen that, were the impedance values of all antenna elements equal, then the elements closest to the input terminals 32 would absorb a disproportionately large share of the power. Taking as an example the case where the impedance of each element is such that it absorbs one-half of the power supplied to it, it will be seen that, neglecting reflections, element 21 would absorb one-half the total power, element 22 one-quarter of the total, element 23 only one-eighth, and so on. From the foregoing explanation it will be observed that it is advantageous for the various antenna elements, and particularly those which are most effective at any given frequency, to be arranged so that they have different relative degrees of absorption of impinging power, with greater relative absorption for those effective antenna elements which are farther from the feed point 32.

According to the invention this relationship of relative absorption of power from the transmission line is maintained for at least several of the antenna elements at all frequencies within the antenna operating frequency range. This can be accomplished throughout the low band by proper selection of element length and is accomplished also in the high band by provision of additional means for independently determining the antenna element impedance on the high band. The opposite technique of selecting high band impedances by element length and low band impedances otherwise might alternatively be used.

FIGURES 8 to 11 are Smith chart impedance diagrams of certain antenna elements for the extremes of the high and low bands, such as VHF television channels 2, 6, 7 and 13, which illustrate this impedance relationship.

In FIGURES 8 to 11, antenna element complex impedances are plotted on the well known Smith chart curved coordinate system. The impedances plotted are those which would be measured for the particular active antenna element individually and apart from the array as a whole. The impedance plotted is that relative to the transmission line harness characteristic impedance, that is, it is the normalized impedance. In the analysis presented in connection with FIGURES 8 to 11, the transmission line will be considered to be terminated in a matched load for simplicity. Although this is not actually the case the assumption is believed justified in presenting a simple explanation of the basic principles involved.

Impedance coordinates are given by the dashed-line curves in FIGURES 8 to 11, the resistance component of normalized impedance being plotted on the closed circular dashed-line curves 81, and the reactance component being plotted on the dashed-line curves 83 converging toward the right as indicated by the legends. The complex impedances of three antenna elements have been plotted in each figure. The values plotted actually represent those of the embodiment of the antenna shown in FIGURES 6 and 7, but generally similar values would be found for other embodiments of the invention also. Accordingly the points labeled "Element No. 1" and "Element No. 10" in FIGURES 8 to 11 may be considered to represent the complex impedances of either elements 21 and 30 of the antenna shown in FIGURES 1 to 3 of elements 51 and 60 of the antenna shown in FIGURES 6 and 7. Intermediate points represent respective intermediate elements.

The solid-line closed circular curves 85 in FIGURES 8 to 11 are the loci of impedance values for which the percentage of impinging power absorbed by an antenna element would have the value as indicated (i.e. 67%, 50%, 33% or 10%).

Figure 8:
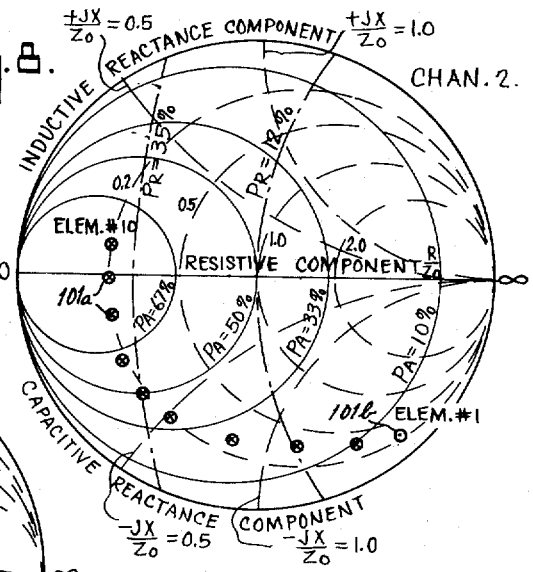
FIGURES 8 through 11 are Smith chart impedance diagrams of the antenna elements of a typical antenna according to the present invention, presented to aid in the explanation of a theory of operation of the antenna.

Considering first FIGURE 8, showing the impedance relations of the antenna array for channel 2, it will be noted that the power absorbed by various antenna elements is greatest for element No. 10 farthest from the antenna feed point and generally decreases for elements nearer the feed point.

One of the features of the present invention is that for certain channels some of the antenna elements are effective, while for different channels another group of elements is effective. These various groups which are effective on various channels will generally overlap. In considering which elements are effective at any channel, it should be noted that there are a relatively large number of elements illustratively ten. If all were equally effective, each would have the same induced current as the others, and each would contribute 10% of the total. However, this condition is a theoretical one which could only exist at a single channel, and in fact does not exist on any channel, due to the necessity of design compromise to assure useful action on all channels. In actual practice, the currents in the various elements vary widely from element to element and from channel to channel. If the maximum current for all elements at a single frequency is considered unity, then any element whose current is less than ¼ that maximum contributes so little to operation at that channel as to be relatively ineffective. However, at another channel, such an ineffective element may be highly effective. In FIG. 8, the points 101a and 101b have been indicated respectively with crossed circles and open circles to indicate the elements of the antenna which are essentially effective at channel 2 and those which are substantially ineffective.

Figure 9:
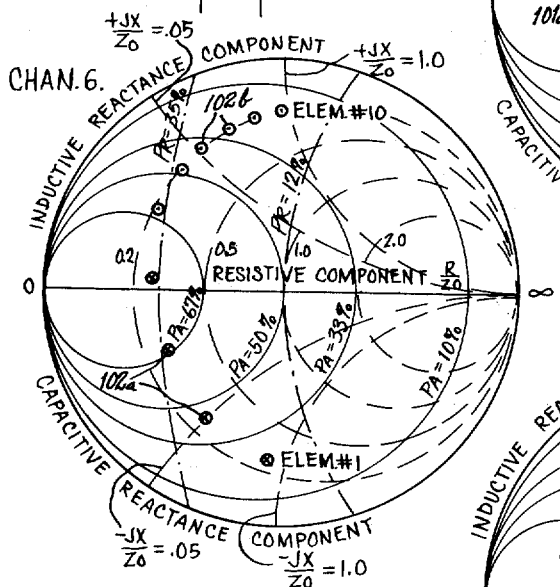

Referring now to FIGURE 9, this figure shows the impedance relationships at channel 6, near the high end of the low-frequency band, at which a small portion of the antenna elements are predominantly effective as indicated by the relatively fewer crossed circle points 102a. It will be noted for example that for this channel elements 5 through 10 are relatively ineffective, for the shorter forward antenna elements 1 to 4, however, which are effective, the relationship of greater power absorption for elements farther from the antenna feed point prevails as in the case of channel 2.

The impedance relationships thus far indicated for low-band frequencies can be achieved simply by selection of the length of the active antenna elements. It may be noted that while there are some similarities between the basis of the operation of the antenna and that of antennas disclosed in Schwartz et al. Patent No. 2,817,085 mentioned above, there are also marked dissimilarities between the present antenna and those disclosed in the previous patent. For example, in the present antenna the impedances of the effective elements are highest nearest the front, while in the prior patented antenna, they are highest nearest the rear. Also, the present transmission line harness is transposed instead of straight, and those antenna elements primarily operational at any particular frequency are predominantly capacitively reactive rather than being inductively reactive as were the elements in the antennas disclosed in that patent.

Figure 10:
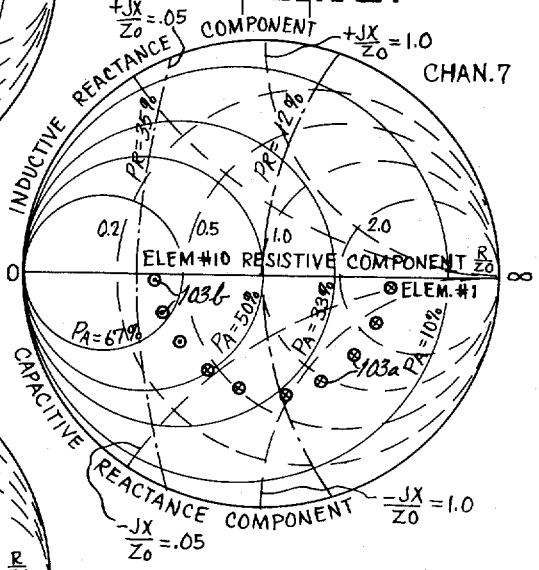
Figure 11:
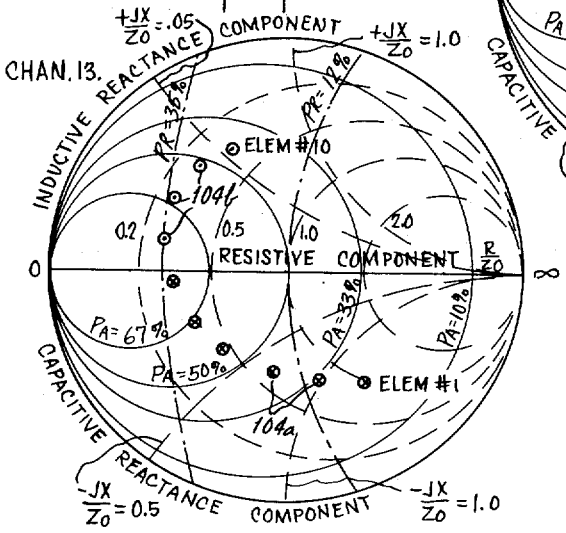

By reference to FIGURES 10 and 11 relating to channel 7 and channel 13 respectively, it will be seen that the individual antenna element impedances at the high band have also been determined so that the predominantly effective elements at each frequency are arranged in order of increasing percentage of absorption toward the rear of the antenna as shown by points 103a, 103b, 104a and 104b. Particularly those elements near the antenna feed point have the desired absorption relation; this is important to prevent the middle and rear elements from being ineffective.

Another advantageous aspect of antennas according to the present invention is illustrated in FIGURES 8 to 11. Dot-dash curved lines 105, 106 are drawn showing normalized impedance values at which the percentage of energy reflected at the antenna element-transmission line junction would be 35% and 12% respectively.

In the discussion of the percentage of absorption previously presented, the absorption figures were given only for that power which was not reflected. Obviously to the extent that there is an impedance mismatch at the junction of the transmisison line harness and the antenna element some reflection will take place.

From FIGURES 8 to 11 it will be observed that the percentage of reflection is generally less toward the right of the diagram. The antenna performance will obviously be enhanced if the reflection is minimized, and it is particularly important that there be a relatively low value of reflection for those antenna elements closest to the antenna feed point, for as one approaches the antenna feed point a greater proportion of the total power is subject to reflection. It will be observed in FIGURES 8 to 11 that in all cases element No. 1 is well below the 35% reflection value and in most cases it is below the 12% reflection value. This feature of the antenna provides a good impedance match throughout its operating frequency range and contributes to its superior signal gathering ability.

As illustrations of specific embodiments of the antenna, the dimensions of representative samples of the antennas shown in FIGURES 1 to 3 and in FIGURES 6 and 7 are presented hereinbelow in tabular form.

TABLE I.—FIG. 1 FORM

| Elem. No. | Half-Length, inches | Spacing From Rear Adjac. Elem., inches | Forward Tilt Angle, degrees | Capacitor Value, mmf. |
|---|---|---|---|---|
| 1 | 37 | 12 | 30 | 12 |
| 2 | 38¾ | 12 | 30 | 20 |
| 3 | 40½ | 12 | 30 | 25 |
| 4 | 42¼ | 12 | 30 | 30 |
| 5 | 44 | 12 | 30 | ---------- |
| 6 | 45¾ | 12 | 30 | ---------- |
| 7 | 47¼ | 12 | 30 | ---------- |
| 8 | 49 | 12 | 30 | ---------- |
| 9 | 50¾ | 12 | 30 | ---------- |
| 10 | 52 | ---------- | 30 | ---------- |

Element diameter—⅜″.
Element terminals—3 inch spacing.
Harness wire—⅛″ diameter.

TABLE II.—FIG. 7 FORM

| Elem. No. | Length, inches | Spacing From Rear Adjac. Elem., inches |
|---|---|---|
| D-1 | 67½ | 12 |
| D-2 | 60 | 12 |
| D-3 | 67½ | 9 |
| P-1 | 19 | 3 |
| 1 | 45 | 9 |
| P-2 | 20½ | 3 |
| 2 | 59 | 9 |
| P-3 | 22 | 3 |
| 3 | 60 | 8½ |
| P-4 | 23½ | 3½ |
| 4 | 67½ | 8½ |
| P-5 | 25 | 3½ |
| 5 | 75 | 8½ |
| P-6 | 26½ | 3½ |
| 6 | 83 | 8½ |
| P-7 | 28 | 3½ |
| 7 | 87 | 8 |
| P-8 | 29½ | 4 |
| 8 | 94 | 8 |
| P-9 | 31 | 4 |
| 9 | 102½ | 8 |
| P-10 | 32 | 4 |
| 10 | 110 | ---------- |

It will be understood that the foregoing illustrations of specific embodiments of antennas are presented by way of example only and are not intended to be limiting. Numerous variations in the actual construction of the antenna will be apparent to those of skill in the art. For example, active elements of types different than those illustrated may be utilized. However, it is preferred that the active elements be of the type which operate in higher order modes in at least part of the frequency range. It is also somewhat to be preferred that the active elements be of the type which operate in a higher order mode in such a manner as to have greater signal gathering ability than the standard half-wave dipole, that is, that they operate as a longer-than-half-wave dipole or as a set of colinear half-wave dipoles, so as to have positive gain. This enhances the high-band efficiency of the dipoles of the antenna arrays disclosed in FIGURES 1 to 3 and 6 to 7. The postive element gain of the elements of the illustrated antennas in the high order mode makes them superior to previous high band end-fire antennas and they are accordingly adaptable for use even where no low order mode (half-wave) operation is contemplated. In such case the antenna parameters may be optimized for solely high band or high order mode operation.

Antennas according to the present invention may also be varied or modified by changing the type of interconnecting transmission line to other than an air-dielectric two-wire transmission line or by varying the physical dimensions such as spacing between elements, element lengths, transmission line wire spacing and the like so long as the electrical characteristics conform to those described and claimed as within the scope of the invention.

It will also be apparent that parasitic elements could be added to the embodiment shown in FIGURES 1 to 3 or that different parasitic elements could be utilized in conjunction with the embodiment illustrated in FIGURES 6 and 7, or alternately the parasitic elements could be dispensed with. Further active elements could also be added, for example in front of the feed point, and such elements need not utilize a transposed transmission line harness.

While the present invention has been specifically described with respect to the two-band VHF television broadcasting, the principles of the invention are useful whenever extremely wide frequency ranges are used of the order of 3 to 1 or more, and is particularly not limited to harmonically related frequency bands.

Numerous other variations will be apparent to those of skill in the art in addition to those described or suggested and it is accordingly desired that the scope of the invention not be restricted to those embodiments shown or suggested but that it shall be limited solely by the scope of the appended claims.

Certain theories of operation of antennas according to the present invention have been set forth which are believed to be correct, but the scope of the invention is in no way intended to be limited by the theory of operation described, and the operability of the antenna is based upon performance of the actual embodiments presented by way of example and not upon theoretical considerations.

What is claimed is:

1. A broad-band directive antenna array having a direction of greater effectiveness ertending from its front end comprising at least six dipole elements arrayed in file in horizontally spaced relation with corresponding arms of said dipole elements disposed in a common plane and at least six adjacent ones of said elements being of graduated length decreasing toward the front of said array, means for connecting a signal transmission line to the front one of sai delements, means for connecting each other dipole element of said array to the dipole element forward thereof, the last said means comprising an air-dielectric transmission line harness with the conductors thereof transposed to connect respectively to opposite terminals of each pair of adjacent dipole elements which it interconnects, said harness having a length between respective elements substantially equal to the inter-element spacing, said dipole elements having different respective impedances relative to the impedance of said transmission line harness at their respective points of connection thereto, said element relative impedances increasing toward the front of said array and causing the proportion of energy absorbed from the transmission line harness by respective dipole elements to be progressively greater for elements farther from said transmission line connecting means, the said absorption relationship obtaining for any set of three adjacent elements at at least one operating frequency within the operating range of said array, and means for determining the harmonic mode radiation pattern and impedance of certain of said elements comprising close spaced short parasitic elements in front of certain of said dipole elements, siad parasitic elements causing the said absorption relationship to obtain for at least three adjacent dipole elements of said array through said operating range of frequencies, including a portion of said range where said elements function in a harmonic mode.

2. A dual-band directive antenna array having a direction of greater effectiveness extending from its front end comprising at least three active dipole antenna elements arrayed in file in horizontally spaced relation, means for causing said active elements individually to have similarly oriented directivity characteristics at each of two operating frequencies having a frequency ratio of substantially three to one, said means comprising a close spaced short parasitic element substantially parallel to and in front of each of said dipole antenna elements, signal transmission means electrically connected to said active elements for coupling said array to other apparatus said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.

3. A dual-band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of two operating frequencies having a frequency ratio of substantially three to one, said means comprising a close spaced short parasitic element substantially parallel to and in front of each of said dipole antenna elements, means for connecting a signal transmission line to the front one of said elements, harness means for electrically connecting each other antenna element of said group to the antenna element forward thereof, the last said means comprising a transmission line harness having a line transposition between each pair of adjacent antenna elements of said group, said harness having a length between adjacent ones of said elements substantially equal to the spacing between said adjacent elements.

4. A dual-band directive antenna array having a direction of greater effectiveness extending from its front end comprising at least three active dipole antenna elements arrayed in file in horizontally spaced relation, means for causing said active elements individually to have similarly oriented directivity characteristics at each of two operatnig frequencies having a frequency ratio of substantially three to one, said means comprising a close spaced short parasitic element substantially parallel to and in front of each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other elements, said harness means having a line transposition between said one active element and its rearwardly adjacent active element, at each channel in the operating range of said array one group of elements at least three in number having a set of relative impedances related to the characteristic impedances of the harness means connected immediately forwardly thereof, said set of relative impedances decreasing progressively in a rearward direction.

5. A dual-band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of two operating frequencies having a frequency ratio of substantially three to one, said means comprising a close spaced short parasitic element substantially parallel to and in front of each of said dipole antenna elements, means for connecting a signal transmission line to the front one of said elements, harness means for electrically connecting each other antenna element of said group to the antenna element forward thereof, the last said means comprising a transmission line harness having a line transposition between each pair of adjacent antenna elements of said group, said harness having a length between adjacent ones of said elements substantially equal to the spacing between said adjacent elements, at each channel in the operating range of said array one group of elements at least three in number having a set of relative impedances related to the characteristic impedances of the harness means connected immediately forwardly thereof, said set of relative impedances decreasing progressively in a rearward direction.

6. A dual-band directive antenna array having a direction of greater effectiveness extending from its front end comprising at least three active dipole antenna elements arrayed in file in horizontally spaced relation, the least interelement spacing between any two of said elements differing not more than 20% from the greatest interelement spacing between any adjacent two of said elements, means for causing said active elements individually to have similarly oriented directivity characteristics at each of two operating frequencies having a frequency ratio of substantially three-to-one, said means comprising a close spaced short parasitic element substantially parallel to and in front of each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.

7. A dual-band directive antenna array having a direction of greater effectiveness extending from its front end comprising at least three active dipole antenna elements arrayed in file in horizontally spaced relation, with each interelement spacing not greater than substantially one-quarter wave-length at the highest operating frequency of said array, means for causing said active elements individually to have similarly oriented directivity characteristics at each of two operating frequencies having a frequency ratio of substantially three-to-one, said means comprising a close spaced short parasitic element substantially parallel to and in front of each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.

8. A dual-band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of the two operating frequencies having a frequency ratio of substantially three-to-one, said means comprising a close spaced conductive rod element substantially parallel to and in front of each of said dipole antenna elements and having a length not more than half that of its corresponding dipole antenna element, means for connecting a signal transmission line to the front one of said elements, harness means for electrically connecting each other antenna element of said group to the antenna element forward thereof, the last said means comprising a transmission line harness having a line transposition between each pair of adjacent antenna elements of said group.

9. A dual-band directive antenna array having a direction of greater effectiveness extending from its front end comprising at least three active dipole antenna elements arrayed in file in horizontally spaced relation, with each interelement spacing not greater than substantially one-quarter wave-length at the highest operating frequency of said array and with the least interelement spacing between any two of said elements differing not more than 20% from the greatest interelement spacing between any adjacent two of said elements, means for causing said active elements individually to have similarly oriented directivity characteristics at each of two operating frequencies having a frequency ratio of substantially three-to-one, said means comprising a close spaced short parasitic element substantially parallel to and in front of each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.

*10. A broad-band directive antenna array having a direction of greater effectiveness extending from its front end comprising at least six dipole elements arrayed in file in horizontally spaced relation with corresponding arms of said dipole elements disposed in a common plane and at least six adjacent ones of said elements being of graduated length decreasing toward the front of said array, means for connecting a signal transmission line to the front one of said elements, means for connecting each other dipole element of said array to the dipole element forward thereof, the last said means comprising an air-dielectric transmission line harness with the conductors thereof transposed to connect respectively to opposite terminals of each pair of adjacent dipole elements which it interconnects, said harness having a length between respective elements substantially equal to the inter-element spacing, said dipole elements having different respective impedances relative to the impedance of said transmission line harness at their respective points of connection thereto, said element relative impedances increasing toward the front of said array and causing the proportion of energy absorbed from the transmission line harness by respective dipole elements to be progressively greater for elements farther from said transmission line connecting means, the said absorption relationship obtaining for any set of three adjacent elements at at least one operating frequency within the operating range of said array, and means for determining the harmonic mode radiation pattern and impedance of certain of said elements comprising close spaced short parasitic elements substantially parallel to respective ones of said dipole elements, said parasitic elements causing the said absorption relationship to obtain for at least three adjacent dipole elements of said array throughout said operating range of frequencies, including a portion of said range where said elements function in a harmonic mode.*

*11. A dual-band directive antenna array having a direction of greater effectiveness extending from its front end comprising at least three active dipole antenna elements arrayed in file in horizontally spaced relation, means for causing said active elements individually to have similarly oriented directivity characteristics at each of two operating frequencies having a frequency ratio of substantially three to one, said means comprising a close spaced short parasitic element substantialy parallel to each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.*

*12. A dual-band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of two operating frequencies having a frequency ratio of substantially three to one, said means comprising a close spaced short parasitic element substantially parallel to each of said dipole antenna elements, means for connecting a signal transmission line to the front one of said elements, harness means for electrically connecting each other antenna element of said group to the antenna element forward thereof, the last said means comprising a transmission line harness having a line transposition between each pair of adjacent antenna elements of said group, said harness having a length between adjacent ones of said elements substantially equal to the spacing between said adjacent elements.*

*13. A dual-band directive antenna array having a direction of greater effectiveness extending from its front end comprising at least three active dipole antenna elements arrayed in file in horizontally spaced relation, means for causing said active elements individually to have similarly oriented directivity characteristics at each of two operating frequencies having a frequency ratio of substantially three to one, said means comprising a close spaced short parasitic element substantially parallel to each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other elements, said harness means having a line transposition between said one active element and its rearwardly adjacent active element, at each channel in the operating range of said array one group of elements at least three in number having a set of relative impedances related to the characteristic impedances of the harness means connected immediately forwardly thereof, said set of relative impedances decreasing progressively in a rearward direction.*

*14. A dual band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of two operating frequencies having a frequency ratio of substantially three to one, said means comprising a close spaced short parasitic element substantially parallel to each of said dipole antenna elements, means for connecting a signal transmission line to the front one of said elements, har-*

*ness means for electrically connecting each other antenna element of said group to the antenna element forward thereof, the last said means comprising a transmission line harness having a line transposition between each pair of adjacent antenna elements of said group, said harness having a length between adjacent ones of said elements substantially equal to the spacing between said adjacent elements, at each channel in the operating range of said array one group of elements at least three in number having a set of relative impedances related to the characteristic impedances of the harness means connected immediately forwardly thereof, said set of relative impedances decreasing progressively in a rearward direction.*

*15. A dual-band directive antenna array having a direction of greater effectiveness extending from its front end comprising at least three active dipole antenna elements arrayed in a file in horizontally spaced relation, the least interelement spacing between any two of said elements differing not more than 20% from the greatest interelement spacing between any adjacent two of said elements, means for causing said active elements individually to have similarly oriented directivity characteristics at each of two operating frequencies having a frequency ratio of substantially three-to-one, said means comprising a close spaced short parasitic element substantially parallel to each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.*

*16. A dual-band directive antenna array having a direction of greater effectiveness extending from its front end comprising at least three active dipole antenna elements arrayed in file in horizontally spaced relation, with each interelement spacing not greater than substantially one-quarter wave-length at the highest operating frequency of said array, means for causing said active elements individually to have similarly oriented directivity characteristics at each of two operating frequencies having a frequency ratio of substantially three-to-one, said means comprising a close spaced short parasitic element substantially parallel to each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.*

*17. A dual-band directive antenna array having a direction of greater effectiveness extending from its front end comprising a group of at least three adjacent active dipole antenna elements arrayed in file in horizontally spaced relation with corresponding arms of said dipole antenna elements disposed in a common substantially horizontal plane, said elements being of graduated length decreasing toward the front of said array, means for causing said antenna elements individually to have similarly oriented directivity characteristics at each of the two operating frequencies having a frequency ratio of substantially three-to-one, said means comprising a close spaced conductive rod element substantially parallel to each of said dipole antenna elements and having a length not more than half that of its corresponding dipole antenna element, means for connecting a signal transmission line to the front one of said elements, harness means for electrically connecting each other antenna element of said group to the antenna element forward thereof, the last said means comprising a transmission line harness having a line transposition between each pair of adjacent antenna elements of said group.*

*18. A dual-band directive antenna array having a direction of greater effectiveness extending from its front end comprising at least three active dipole antenna elements arrayed in file in horizontally spaced relation, with each interelement spacing not greater than substantially one-quarter wave-length at the highest operating frequency of said array and with the least interelement spacing between any two of said elements differing not more than 20% from the greatest interelement spacing between any adjacent two of said elements, means for causing said active elements individually to have similarly oriented directivity characteristics at each of two operating frequencies having a frequency ratio of substantially three-to-one, said means comprising a close spaced short parasitic element substantially parallel to each of said dipole antenna elements, signal transmission means electrically connected to said active elements for coupling said array to other apparatus, said signal transmission means comprising (a) means for connecting a signal transmission line to one of said active elements in front of the rear one of said active elements and (b) a harness transmission line means interconnecting said one active element and at least two of said other active elements, said harness means having a line transposition between said one active element and its rearwardly adjacent active element.*

References Cited in the file of this patent or the original patent

| | | |
|---|---|---|
| 2,192,532 | Katzin | Mar. 5, 1940 |
| 2,375,580 | Peterson | May 8, 1945 |
| 2,429,629 | Kandoian | Oct. 28, 1947 |
| 2,817,085 | Schwartz et al. | Dec. 17, 1957 |

OTHER REFERENCES

IRE Transactions on Antennas and Propagation, by D. E. Isbell, May 1960, vol. Ap–8, No. 3, pages 260–267.